United States Patent [19]

Sugiyama

[11] Patent Number: 5,675,385
[45] Date of Patent: Oct. 7, 1997

[54] TRANSFORM CODING APPARATUS WITH EVALUATION OF QUANTIZATION UNDER INVERSE TRANSFORMATION

[75] Inventor: Kenji Sugiyama, Yokosuka, Japan

[73] Assignee: Victor Company of Japan, Ltd., Yokohama, Japan

[21] Appl. No.: 594,718

[22] Filed: Jan. 31, 1996

[30] Foreign Application Priority Data

Jan. 31, 1995 [JP] Japan .................................. 7-034395

[51] Int. Cl.$^6$ .................................................. H04N 7/32
[52] U.S. Cl. .................................................. 348/405
[58] Field of Search .................................. 348/405, 419, 348/413, 412, 411, 414, 402, 401, 400, 416, 415, 409, 390, 384; 382/251, 252; 341/200; 375/243, 245, 240, 241; 395/2.39; 381/29, 30; H04N 7/133, 7/137

[56] References Cited

U.S. PATENT DOCUMENTS

| | | | |
|---|---|---|---|
| 5,159,611 | 10/1992 | Tomita et al. | 381/30 |
| 5,237,410 | 8/1993 | Inoue | 348/409 |
| 5,251,028 | 10/1993 | Iu | 348/400 |

OTHER PUBLICATIONS

Improvement of Two–step Nearest Neighbor Search Algorithm using Coarse Scalar Prequantizer, 1994, Picture Coding Symp. Japan 5–15 (Oct. 1994), Faculty of Eng., Ehime Univ.

A Performance Evaluation of Two–step Nearest Neighbor Search Algorithm with Coarse Prequantization, pp. 23–28 (May 1994), Technical Report of IEICE.

Taniguchi, Tomohito et al. "ADPCM with a Multiquantizer for Speech Coding", IEEE Journal on Selected Areas in Communications, vol. 6, No. 2, Feb. 1988, pp. 410–424.

Tomita, Yoshihiro et al. "An Implementation of a Variable Rate Codes Based on ADPCM with Multiquantizer (ADPC-M-MQ)", IEEE Global Telecom–Conf., 1988, pp. 1080–1084 (month not available).

Primary Examiner—Tommy P. Chin
Assistant Examiner—Bryan S. Tung
Attorney, Agent, or Firm—Jacobson, Price, Holman & Stern, PLLC

[57] ABSTRACT

In an apparatus for recording and transmitting audio and/or video data, a high efficiency coding apparatus digitalizes input signals on the basis of a lesser amount of data by use of transform coding. In the transform coding of audio and/or video signals, a plurality of quantizers slightly different from each other for transform coefficients are provided. The quantized results are inversely transformed by IDCTs to obtain respective reproduced signals. The obtained reproduced signals are compared with input signals by subtracters for error evaluation. The optimum quantization results are selected by a code selector. It is thus possible to execute accurate quantization.

6 Claims, 4 Drawing Sheets

| 110.5 | -3.2 | <u>1.6</u> | -0.3 | 0.1 | 0.2 | -0.1 | 0.0 |
|---|---|---|---|---|---|---|---|
| 1.3 | 0.3 | -0.1 | -2.2 | 0.2 | 0.1 | 0.4 | 0.1 |
| 0.2 | -0.3 | 0.1 | -0.1 | 0.0 | 0.1 | 0.0 | 0.0 |
| -0.8 | 0.1 | 0.0 | 0.0 | 0.0 | -0.2 | 0.0 | 0.0 |
| 0.1 | 0.0 | 1.0 | 2.1 | 0.0 | 0.0 | 0.0 | -0.1 |
| -0.3 | 0.2 | 0.0 | 0.0 | 0.0 | 0.0 | 0.0 | 0.0 |
| 0.2 | 0.0 | 0.0 | 0.3 | 0.0 | -0.1 | 0.0 | 0.0 |
| 0.1 | -0.1 | 0.1 | 0.0 | 0.0 | 0.0 | 0.0 | 0.0 |

FIG.4A

| 111 | -3 | <u>2</u> | 0 | 0 | 0 | 0 | 0 |
|---|---|---|---|---|---|---|---|
| 1 | 0 | 0 | -2 | 0 | 0 | 0 | 0 |
| 0 | 0 | 0 | 0 | 0 | 0 | 0 | 0 |
| -1 | 0 | 0 | 0 | 0 | 0 | 0 | 0 |
| 0 | 0 | 1 | 2 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG.4B

| 111 | -3 | <u>1</u> | 0 | 0 | 0 | 0 | 0 |
|---|---|---|---|---|---|---|---|
| 1 | 0 | 0 | -2 | 0 | 0 | 0 | 0 |
| 0 | 0 | 0 | 0 | 0 | 0 | 0 | 0 |
| -1 | 0 | 0 | 0 | 0 | 0 | 0 | 0 |
| 0 | 0 | 1 | 2 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG.4C

TRANSFORM CODING APPARATUS WITH EVALUATION OF QUANTIZATION UNDER INVERSE TRANSFORMATION

BACKGROUND OF THE INVENTION

1. Field of the Invention

The present invention relates to a high efficiency transform coding apparatus for digitalizing audio and video signals on the basis of a lesser amount of data in accordance with transform coding, in an apparatus for recording and transmitting audio and video data.

2. Description of the Prior Art

As one of high efficiency coding methods for audio and video signals, transform coding method represented by discrete cosine transform (DCT) has been well known. In this method, signals are partitioned by constant blocks, and the partitioned signals are orthogonal transformed in unit of block.

FIG. 1 shows an example of the prior art coding apparatus, in which signals supplied through a video input (signal input) 1 are given to a DCT 2.

In the case where the input signals are video signals, the DCT 2 executes two-dimensional discrete cosine transform (DCT) in unit of block of 8×8 pixels, for instance. The transformed predictive residual signals (DCT coefficients) are given to a quantizer 3A.

The quantizer 3A quantizes the given coefficients on the basis of quantization step-width data given by a buffer 5 in unit of block. The quantized fixed length codes are given to a variable length coder 4.

In the above-mentioned quantization, threshold values between which a value to be quantized is interposed are decided on the basis of the relationship between a plurality of threshold values determined at regular intervals for each coefficient and the numerical values of the coefficients to be quantized. The obtained data are outputted in the form of fixed length codes.

Here, the quantization step width (the intervals of the threshold values) of each coefficient is decided by multiplying the quantization step width value of block unit by a reciprocal number (weighting value) of visual sensitivity for each coefficient.

Here, since the visual sensitivity decreases with increasing frequency of the signals, the quantization step width is widened as the coefficients correspond to higher frequencies.

Further, the weighting values are previously determined for each coefficient, separately from the quantization data given by the buffer 5.

The variable length coder 4 compresses the fixed length codes to compressed variable length codes. The compressed variable length codes are given to the buffer 5.

In the practical method of the variable length coding, the two dimensional arrangement of the DCT data are rearranged into a one-dimensional arrangement on the basis of zigzag scanning. Further, the non-zero values are coded as they are, and the run lengths (continuous numbers) of zeros are coded, both in accordance with Huffman codes.

The buffer 5 absorbs the fluctuations of the amount of codes generated due to variable length coding, and output the variable length codes in a constant transfer rate through a code output 6.

Further, the buffer 5 decides the quantization step width for each block unit on the basis of the occupancy of the buffer in order to control the transfer rate. The decided data are given to the quantizer 3A.

FIG. 2 shows an example of prior art decoding apparatus corresponding to the coding apparatus shown in FIG. 1.

Video data applied through a code input 61 are given to a variable length decoder 63 via a buffer 62.

The variable length decoder 63 returns the variable length codes into fixed length codes. The obtained fixed length codes are given to an inverse quantizer 64.

The inverse quantizer 64 obtains representative quantization values corresponding to the fixed length codes, and the reproduced coefficients are given to an inverse DCT 65.

The inverse quantizer 64 obtains the quantization step width for each coefficient on the basis of the block-unit quantization step width data transmitted together with the video data and weighting values of visual sensitivity previously determined for each coefficient. On the basis of these quantization step widths, a representative quantization value is decided.

In the inverse DCT 65, the processing opposite to that of the DCT 2 shown in FIG. 1 is executed. The reproduced video signals thus obtained are outputted through a video output 66.

In the transform coding of the prior art coding apparatus, since the transformed signals are quantized, the quantization errors of the inversely-transformed reproduced signals are not necessarily minimized from the standpoints of RMS values.

Further, since the quantization errors of the reproduced signals are diffused within each transform block, there exists a problem in that the errors are prominent at the peripheral flat portions of the large amplitude portions (e.g., picture edges).

In addition, since there exists no correlation with respect to the quantization error between adjacent blocks, there exists another problem in that the boundaries of the blocks are not continuous.

SUMMARY OF THE INVENTION

With these problems in mind, therefore, it is the object of the present invention to provide a transform coding apparatus which can achieve quantization of less effective errors.

The present invention provides a transform coding apparatus, comprising: transforming means for obtaining coefficients of frequency components by transforming signals to be coded into respective frequency components, in transform coding for processing video signals and/or audio signals in unit of block; a plurality of quantizing means for obtaining a plurality of different sorts of codes by quantizing the obtained coefficients in accordance with respective different quantization characteristics; a plurality of inverse quantizing means for obtaining reproduced coefficients on the basis of the obtained codes in correspondence to each of a plurality of said quantizing means; a plurality of inverse orthogonal transforming means for obtaining reproduced signals on the basis of the obtained reproduced coefficients in correspondence to each of a plurality of said inverse quantizing means; error detecting means for obtaining error amounts between signals to be coded and the reproduced signals obtained by a plurality of said inverse orthogonal transforming means; and selecting means for selecting one of said quantizing means having a minimum error by comparing error amounts of the reproduced signals obtained by a plurality of said inverse orthogonal transforming means.

The transform coding apparatus may further comprise: temporary quantizing means for obtaining relative relationship between the coefficient values and threshold values for scalar quantization; and a plurality of quantizing means for obtaining respective different codes by quantizing the transform coefficients on the basis of threshold values slightly corrected for each coefficient relative to the threshold values of the scalar quantization. The apparatus may further comprise quantization control means for correcting the quantization threshold values of only the coefficients close to the threshold values of the scalar quantization, without correcting the threshold values of the scalar quantization of the other remaining coefficients.

The transform coding apparatus may further comprise: evaluating means for obtaining an evaluation function indicative of subjective error sensitivity of input signals in unit of block smaller than transform block; and selecting means for selecting a quantizer by evaluation of the reproduced signals in accordance with the evaluation function of the error sensitivity.

The transform coding apparatus may further comprise: a plurality of generated code amount measuring means for obtaining code amounts when a plurality of sorts of codes obtained by a plurality of said quantizing means are variable-length coded; means for obtaining corrected block error amounts by multiplying the error amounts obtained by error detecting means by the coded amounts; and selecting means for selecting a quantizer by evaluating the reproduced signals in accordance with the corrected block error amounts.

BRIEF DESCRIPTION OF THE DRAWINGS

FIGS. 4A to 4C are illustrations for assistance in explaining the quantization results of the DCT coefficients;

DETAILED DESCRIPTION OF THE EMBODIMENTS

Preferred embodiments of the transform coding apparatus according to the present invention will be described in detail hereinbelow with reference to the attached drawings.

Figure 1:
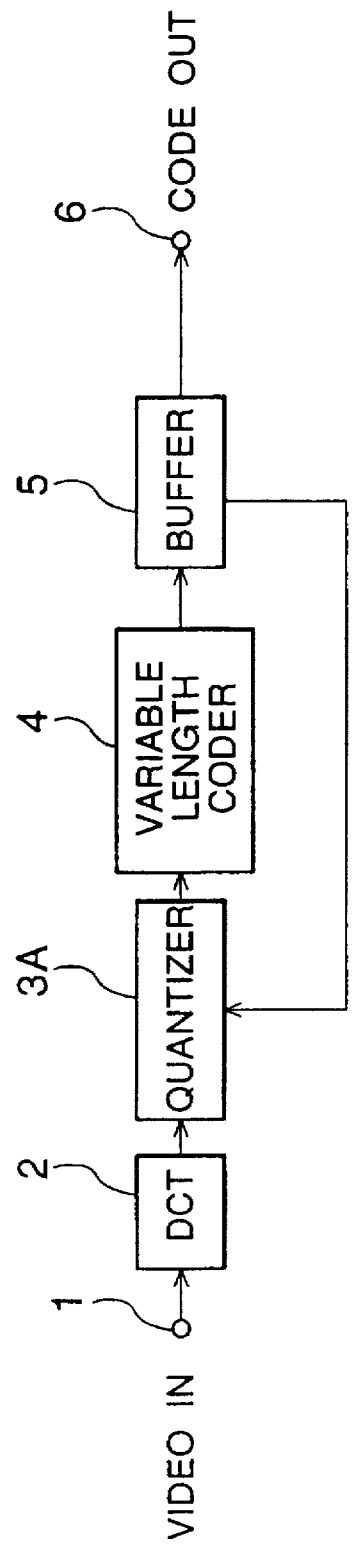
FIG. 1 is a block diagram showing a prior art transform coding apparatus.
Figure 3:
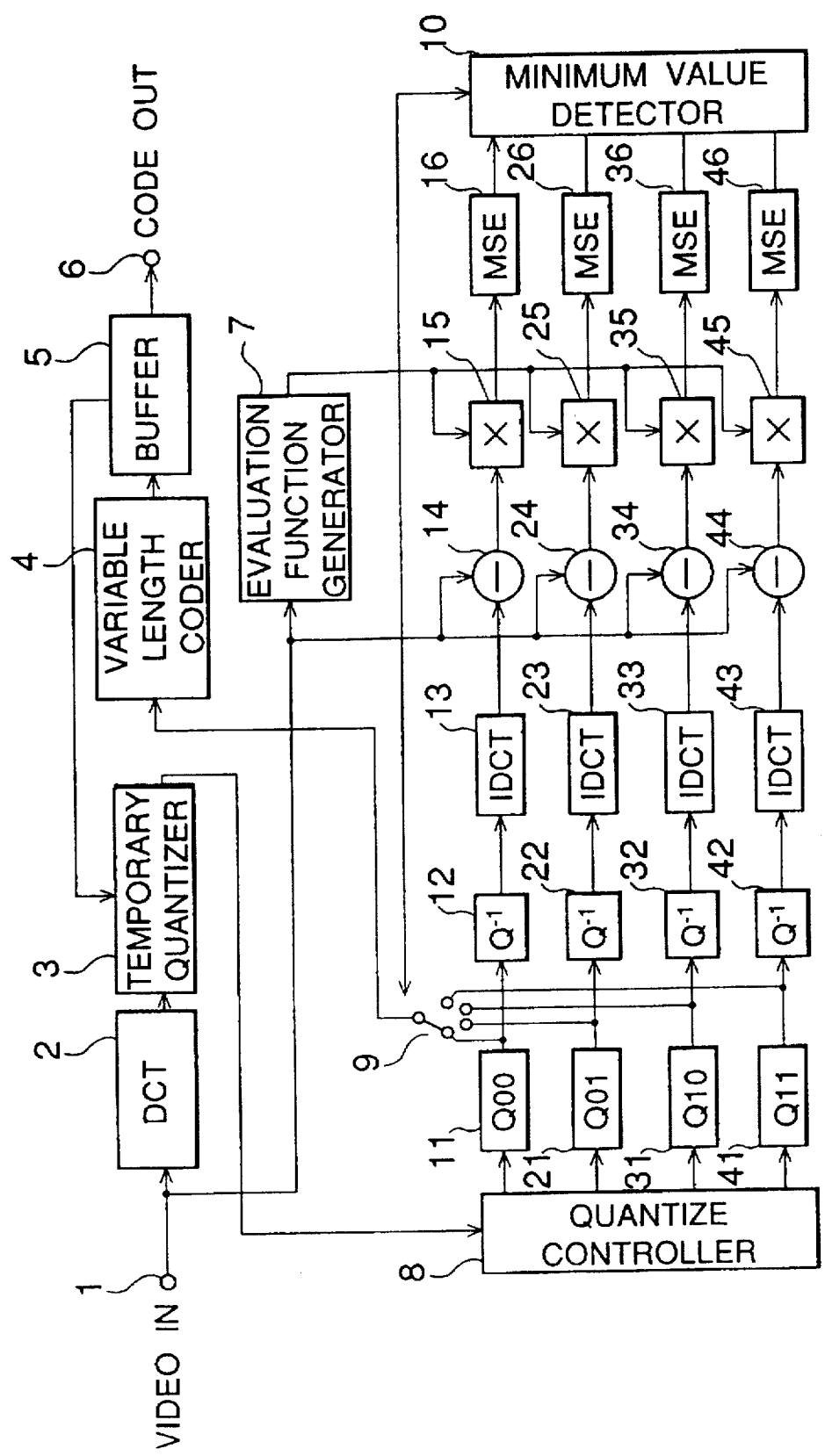
FIG. 3 is a block diagram showing a first embodiment of the transform coding apparatus according to the present invention.

FIG. 3 is a block diagram showing a first embodiment of the transform coding apparatus according to the present invention, in which the same reference numerals have been retained for the similar elements having the same functions as with the case of the prior art coding apparatus shown in FIG. 1.

The coding apparatus shown in FIG. 3 is different from that shown in FIG. 1 in that a temporary quantizer 3 is provided instead of the quantizer 3A and further in that an evaluation function generator 7, a quantize controller 8, correction quantizers 11 to 41 (11, 21, 31, and 41), inverse quantizers 12 to 42 (12, 22, 32, and 42), inverse DCTs (IDCTs) 13 to 43 (13, 23, 33, and 43), subtracters 14 to 44 (14, 24, 34, and 44), error evaluators 15 to 45 (15, 25, 35, and 45), means square error calculators 16 to 46 (16, 26, 36, and 46), a switch 9, and a minimum value detector 10 are additionally provided. That is, the first embodiment of the transform coding apparatus according to the present invention is basically the same in operation as with the case of the prior art apparatus shown in FIG. 1, except the operation of quantization.

In FIG. 3, video signals inputted through a signal input 1 are applied to a DCT (signal transforming means) 2 to transform the inputted video signals into coefficients. The transformed coefficients are given to a temporary quantizer 3. The video signals inputted to the temporary quantizer 3 are processed as follows: Here, however, the same following operation can be applied to the other signals (e.g., audio signals, inter-picture prediction residual signals, etc.).

The temporary quantizer 3 obtains each quantization step width of each coefficient on the basis of block-unit quantization step widths and weighting values for visual sensitivity previously determined for each coefficient, both given by a buffer 5 (described later). That is, each coefficient is divided by each obtained quantization step width, and the divided results are given to a quantize controller 8 together with the quantization step width data for each block unit.

In the ordinal quantization, the divided results are integers obtained by counting fractions of 0.5 and over as a unit and by cutting away the rest, and the obtained integers are used, as they are, as fixed length codes. In the present embodiment, however, the decimal fractions are also left as they are. Consequently, this temporary quantizer 3 can be regarded as executing normalization processing for a unit quantizer. Here, therefore, these divided results are referred to as normalized coefficients. Further, in the above-mentioned quantization, there exists the case where the threshold values are slightly shifted as ±0.6, ±1.6, ±2.6, . . . . , instead of the ordinary rounding to the nearest integer on the basis of the threshold value of 0.5.

The quantize controller 8 selects N-units of normalized coefficients near the predetermined threshold values (e.g., ±0.6) in order to quantize a plurality of sorts of quantization which slightly differ from the ordinary quantization. In other words, with respect to the N-units of normalized coefficients, two sorts of quantizations are set by rounding up each coefficient to the nearest larger integer and by rounding down each coefficient to the nearest smaller integer on the basis of the threshold value close to the normalized coefficient. For instance, in the case where the coefficient value is 1.6 and the threshold value is 1.5, 2 is selected in the ordinary quantization by rounding up the coefficient. Here, however, 1 obtained by cutting away 1.6 is also set by rounding down the coefficient.

Further, the non-selected coefficients are quantized in accordance with the ordinary quantization. FIGS. 4A to 4C show the coefficients of 8×8 DCTs, in which the upper right side indicates a DC component. In the drawings, two-sorts of quantized results are listed, because an underlined temporary (normalized) coefficient 1.6 shown in FIG. 4A is shown as 2 (the first quantized result) in FIG. 4B and as 1 (the second quantized result) in FIG. 4C. As described above, since two-sort quantization methods are adopted for N-units of coefficients, the number of quantization methods is $2^N$ for each block.

In the coding apparatus shown in FIG. 3, N is 2 and thereby the number of sorts of quantization methods are 4, so that the coefficients are quantized by four correcting quantizers 11 to 41. Further, in FIG. 3, although the sorts of the quantization methods are determined to be 4 for brevity, a greater number of correcting quantizers are usually used in an actual coding apparatus.

Further, the reason why the normalized coefficients are selected beginning from those near the threshold values is that the possibility of less evaluation error is relatively high in the case where the coefficients near the threshold values are rounded down (cut away to the nearest smaller integer). On the other hand, the possibility of less evaluation error is relatively low in the case where the coefficients away from the threshold values are rounded down.

The four sorts of the quantizations are set by the quantize controller 8, and each quantization processing is allocated to each of the four correction quantizers 11 to 41. The correction quantizers 11 to 41 execute the respective quantization processing of the four sorts of quantizations.

The quantized results (i.e., fixed length codes) are given to the inverse quantizers 12 to 42 together with the block-unit quantization step width data.

Figure 2:
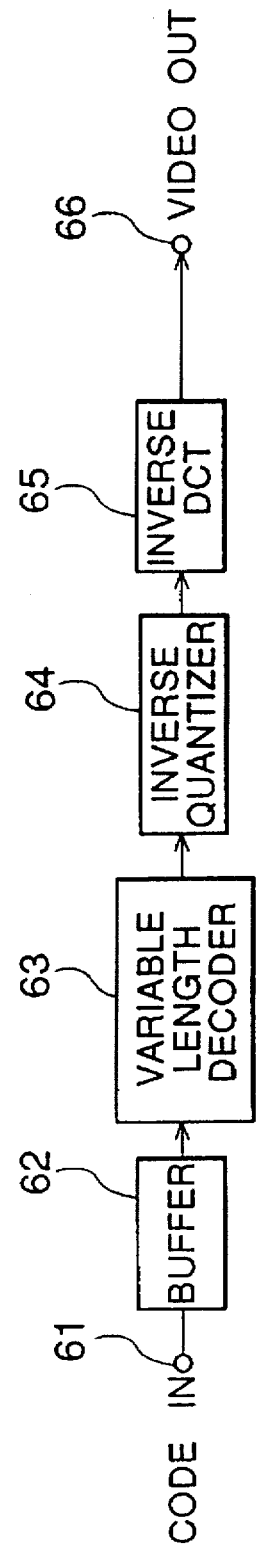
FIG. 2 is a block diagram showing a prior art decoding apparatus.

The respective fixed length codes thus obtained are replaced with representative values of the respective quantization values by the inverse quantizers 12 to 42, in the same way as with the case of the inverse quantizer 64 shown in FIG. 2, as the reproduced coefficients to be applied to the inverse discrete cosine transforms (IDCTs) 13 to 43.

The IDCTs 13 to 43 execute the processing opposite to that executed by the DCT2 to obtain reproduced signals (coefficients). The obtained reproduced signals are given to subtracters 14 to 44.

The subtracters 14 to 44 subtract the input signals (corresponding to the reproduced signals) from the reproduced signals to obtain sampling errors in the current signal areas. The obtained sampling errors are given to the multipliers 15 to 45.

To these multipliers 15 to 45, an evaluation (weighting) function (which corresponds to subjective evaluation for each sampling value (described later)) is supplied from the evaluation function generator 7. The sampling errors are multiplied by the evaluation functions, and the multiplied results are given to means square error calculators (MSE) 16 to 46.

The means square error calculators 16 to 46 square the errors (to which the evaluation function is multiplied), and the means value obtained for each block is given to the minimum value detector 10.

Here, the means square error values are evaluation error values for corresponding quantization methods. Therefore, the minimum value detector 10 detects the minimum evaluation error value. A number data representative of the detected minimum evaluation error value is given to the switch 9. Here, the minimum value detector 10 and the switch 9 constitute selecting means for selecting one quantizer of the minimum error.

In accordance with the number data indicative of the quantization method of the minimum evaluation error, the switch 9 selects the fixed length code, and gives the selected code to the variable length coder 4.

The variable length coder 4 compresses the fixed length code to the variable length codes, and applies the compressed variable length codes to the buffer 5. The practical method of the variable length coding is the same as with the case of the conventional method.

The buffer 5 absorbs the fluctuations of the amount of generated codes, and outputs the codes through a code output 6 at a constant transfer rate. Further, the quantization step width data decided on the basis of the occupancy of the buffer 5 are supplied to the temporary quantizer 3, as already explained.

As described above, in the coding apparatus according to the present invention, since an appropriate quantization pattern can be selected from a plurality of quantization patterns, this method can be considered as a sort of vector quantizations. In this embodiment, however, values the same as scalar quantization are used at the representative quantization points.

Therefore, the scalar quantization can be adopted on the decoding side. That is, the code book (a sets of the representative quantization points) can be formed by correcting the results of the scalar quantization. The vector quantization is adopted only for a part of coefficients which exist near the threshold value in scalar quantization, and the remaining coefficients are used as the scalar quantization. Further, the coefficient whose quantization is corrected changes for each block.

The high speed processing of the vector quantization related to the above-mentioned quantization is disclosed in "Improvement of two-stage nearest search algorithm by use of coarse pre-quantizers", 1994, Picture Coding Symposium Japan 5-15 (October, 1994) or "A Performance Evaluation of Two-step Nearest Neighbor Search Algorithm with Coarse Prequantization for VQ", IT 94-5, pp. 23–28 (May, 1994) Technical Report of IEICE (the Institute of Electronics, Information and Communication Engineers), JAPAN.

The method of generating the evaluation function will be explained hereinbelow. In this method, since the code book is the same as with the case of the scalar quantization, it is possible to obtain a noticeable effect only when the weighting is executed in unit of sample value in the real region. In other words, in this method, since the error evaluation is executed in the real region, in spite of the fact that the quantization is executed in the transform region, the evaluation function can be formed with respect to the problems so far involved in the prior art DCT processing.

As one of these problems, there exists mosquito noise visually noticeable in the peripheries of picture edge portions. Where the mosquito noise is required to be reduced, the visual sensitivity to the quantization errors at the edge portions and the peripheries thereof is determined as the evaluation function.

Figure 5:
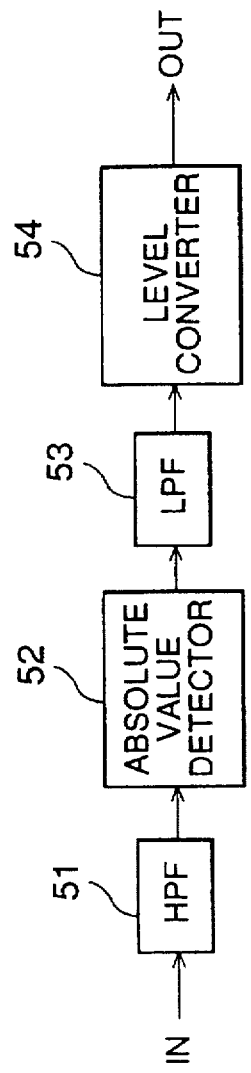
FIG. 5 is a block diagram showing an embodiment of an evaluation function generator according to the present invention.

FIG. 5 is a block diagram showing the evaluation function generator 7 of FIG. 3 for the above-mentioned method.

Here, since the visual sensitivity decreases with increasing local change of picture, in order to obtain the local picture change, high frequency components of the coded signals (input signals to be supplied) are extracted by a high pass filter (HPF) 51.

The obtained high frequency components are given to an absolute value detector 52. Further, the output of the absolute value detector 52 is applied to a low pass filter (LPF) 53 to obtain the envelope thereof. The characteristics of the LPF 53 is related to the size of the block, and the taps thereof is 8×8 pixels in the case of 8×8 DCT.

The obtained envelope thereof is applied to a level converter 54. Here, since the obtained local change values are reciprocal numbers of the visual sensitivity, the evaluation function represents the reciprocal numbers of the local change values obtained by the level converter 54. Further, the changes less than a predetermined value is regarded as the same, and an upper limit of the evaluation function is determined.

Further, as another practical example, there exists an evaluation function for reducing the quantization error at the block boundaries which cause block distortion. In this case, the values near the block boundaries are increased according to the positions in the block, irrespective of the input signals.

Figure 6:
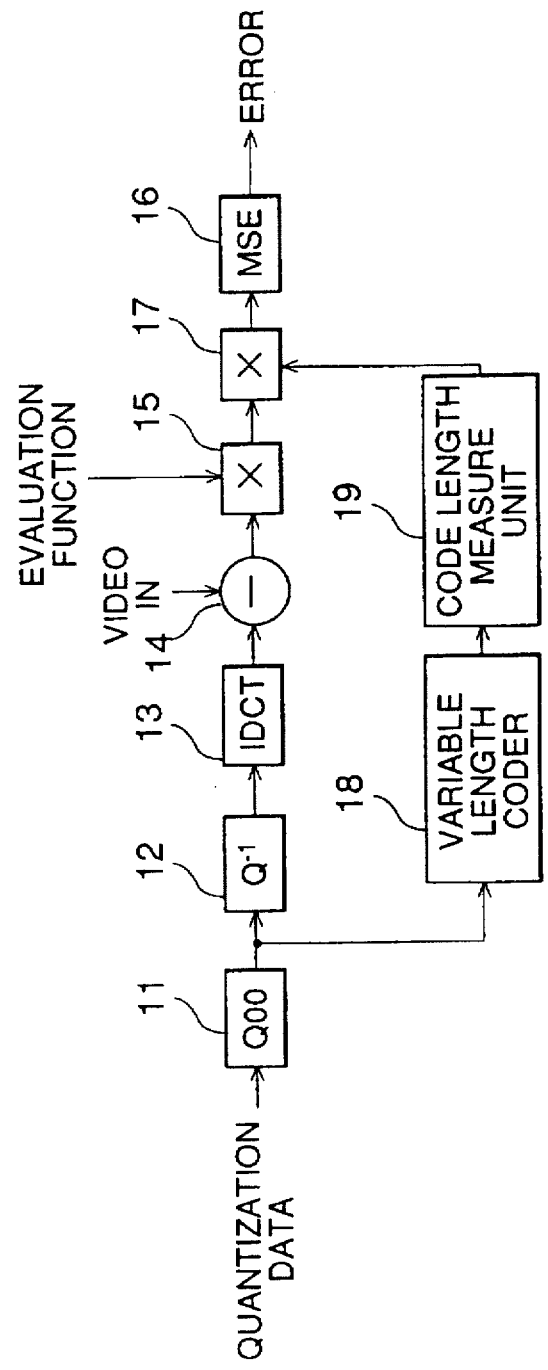
FIG. 6 is a block diagram showing a second embodiment of the transform coding apparatus according to the present invention.

FIG. 6 is a partial block diagram showing a second embodiment of the transform coding apparatus according to the present invention, which corresponds to the portion between the correction quantizer 11 and the means square error calculator 16 shown in FIG. 3. Therefore, the signal input 1, the DCT 2, the temporary quantizer 3, the variable length coder 4, the buffer 5, the code output 6, the evaluation function generator 7, the quantize controller 8, the code selector (switch) 9, and the minimum value detector 10 are all the same as with the case of the first embodiment shown in FIG. 3.

The basic operation of this second embodiment is the same as that of the first embodiment. However, the second embodiment is different from the first embodiment in that the evaluation errors are corrected on the basis of the amount of generated codes.

In the first embodiment shown in FIG. 3, whenever the quantization differs, since the amount of generated codes change according to the errors, in order to evaluate the coding efficiency correctly, it is necessary to evaluate the error under the condition of a constat amount of codes. Here, since the coding efficiency increases with decreasing error and decreasing amount of generated codes, the value obtained by multiplying both is determined as the evaluation value of the coding efficiency.

In FIG. 6, the operation of the correction quantizer 11 is the same as that shown in FIG. 3. However, the obtained fixed length codes are supplied to a variable length coder 18 as well as the inverse quantizer 12.

The operations of the inverse quantizer 12, the inverse DCT (IDCT) 13, the subtracter 14, the multiplier 15, and the means square error calculator 16 are all the same as those of the first embodiment shown in FIG. 3. However, the output of the multiplier 15 is supplied to another multiplier 17 (not the minimum value detector 10 of FIG. 3).

The variable length coder 18 converts the fixed length codes to the variable length codes, in the same way as with the case of the variable length coder 4 shown in FIG. 3. The converted variable length codes are given to a code length measure unit 19. The code length measure unit 19 measures the amount of the generated codes for each block, and gives the measured amount to the multiplier 17.

The multiplier 17 multiplies the evaluation error of each block by the generated code amount, and the multiplied results are given to the means square error calculator 16.

The operation of the means square error calculator (MSE) 16 is the same as that shown in FIG. 3. However, the output results of the means square error calculator 16 are different from that shown in FIG. 3, because the evaluation error is multiplied by the generated code amount.

The decoding apparatus used for the first and second embodiments of the transform coding apparatus according to the present invention shown in FIGS. 3 and 6 is the same as the prior art coding apparatus shown in FIG. 2. In other words, in the present invention, since the table of the representative quantization values are not changed, it is possible to improve the coding efficiency, while keeping a perfect interchangeability with the prior art decoding apparatus.

As described above, in the present invention, since the a plurality of quantizers slightly different from each other are prepared when the transform coefficients are quantized, and further since the appropriate quantized results are selected by evaluating errors of the reproduced signals obtained by inversely transforming the quantized results, it is possible to evaluate the errors of the inversely transformed reproduced signals (not in the transform region) for control of quantization. Consequently, the quantization errors can be evaluated accurately, so that it is possible to execute the quantization more appropriately, thus improving the coding efficiency.

Further, in the transform coding apparatus according to the present invention, since the transform coefficients can be quantized on the basis of the threshold values slightly corrected for each coefficient relative to the threshold values of the scalar quantization, the inverse quantization the same as with the case of the scalar quantization can be executed on the decoding side, so that it is possible to provide an interchangeability with the ordinary scalar quantizing apparatus, while facilitating the quantization processing.

Further, in the transform coding apparatus according to the present invention, since the quantization threshold values of only the coefficients close to the threshold values of the scalar quantization are corrected, it is possible to reduce the number of quantizers markedly.

Further, since the reproduced signals are evaluated by obtaining the evaluation function or the block boundary evaluation function representative of the subjective error sensitivity of the input signals in block unit smaller than the transform block, it is possible to improve the subjective picture quality by selecting the quantizers subjectively desirably.

Furthermore, since the error amount is multiplied by the coding amount obtained when the respective quantization results are converted into the variable length codes, and since the reproduced signals are evaluated on the basis of the amount of the corrected block error, it is possible to select the quantizer the highest in coding efficiency with respect to the relationship between the generated code amount and the error amount, thus improving the coding efficiency. Further, it is possible to obtain necessary reproduction picture quality, in spite of the lesser amount of codes.

What is claimed is:

1. A transform coding apparatus comprising:

transforming means for obtaining coefficients of frequency components by transforming signals to be coded into respective frequency components, in transform coding for processing video signals and/or audio signals in block units;

a plurality of quantizing means for obtaining a plurality of different sorts of codes by quantizing the obtained coefficients in accordance with respective different quantization characteristics;

a plurality of inverse quantizing means for obtaining reproduced coefficients on the basis of the obtained codes in correspondence to each of said plurality of quantizing means;

a plurality of inverse orthogonal transforming means for obtaining reproduced signals on the basis of the obtained reproduced coefficients in correspondence to each of said plurality of inverse quantizing means;

error detecting means for obtaining error amounts between the signals to be coded and the reproduced signals obtained by said plurality of inverse orthogonal transforming means;

selecting means for selecting one of said quantizing means having a minimum error by comparing error amounts of the reproduced signals obtained by said plurality of inverse orthogonal transforming means;

temporary quantizing means for obtaining a relative relationship between coefficient values and threshold values for scalar quantization; and a plurality of quantizing means for obtaining respective different codes by quantizing the transform coefficients on the basis of threshold values slightly corrected for each coefficient relative to the threshold values of the scalar quantization.

2. The transform coding apparatus of claim 1, further comprising quantization control means for correcting quantization threshold values of only the coefficients close to the threshold values of the scalar quantization, without correcting the quantization threshold values of the scalar quantization of the other remaining coefficients.

3. A transform coding apparatus comprising:

transforming means for obtaining coefficients of frequency components by transforming signals to be coded into respective frequency components, in transform coding for processing video signals and/or audio signals in block units;

a plurality of quantizing means for obtaining a plurality of different sorts of codes by quantizing the obtained coefficients in accordance with respective different quantization characteristics;

a plurality of inverse quantizing means for obtaining reproduced coefficients on the basis of the obtained codes in correspondence to each of said plurality of quantizing means;

a plurality of inverse orthogonal transforming means for obtaining reproduced signals on the basis of the obtained reproduced coefficients in correspondence to each of said plurality of inverse quantizing means;

error detecting means for obtaining error amounts between the signals to be coded and the reproduced signals obtained by said plurality of inverse orthogonal transforming means;

selecting means for selecting one of said quantizing means having a minimum error by comparing error amounts of the reproduced signals obtained by said plurality of inverse orthogonal transforming means;

evaluating means for obtaining an evaluation function indicative of subjective error sensitivity of input signals in block units smaller than a transform block; and selecting means for selecting a quantizer by evaluation of the reproduced signals in accordance with the evaluation function of the error sensitivity.

4. A transform coding apparatus comprising:

transforming means for obtaining coefficients of frequency components by transforming signals to be coded into respective frequency components, in transform coding for processing video signals and/or audio signals in block units;

a plurality of quantizing means for obtaining a plurality of different sorts of codes by quantizing the obtained coefficients in accordance with respective different quantization characteristics;

a plurality of inverse quantizing means for obtaining reproduced coefficients on the basis of the obtained codes in correspondence to each of said plurality of quantizing means;

a plurality of inverse orthogonal transforming means for obtaining reproduced signals on the basis of the obtained reproduced coefficients in correspondence to each of said plurality of inverse quantizing means;

error detecting means for obtaining error amounts between the signals to be coded and the reproduced signals obtained by said plurality of inverse orthogonal transforming means;

selecting means for selecting one of said quantizing means having a minimum error by comparing error amounts of the reproduced signals obtained by said plurality of inverse orthogonal transforming means;

a plurality of generated code amount measuring means for obtaining code amounts when a plurality of sorts of codes obtained by said plurality of quantizing means are variable-length coded;

means for obtaining corrected block error amounts by multiplying the error amounts obtained by the error detecting means by the code amounts; and selecting means for selecting a quantizer by evaluating the reproduced signals in accordance with the corrected block error amounts.

5. A transform coding apparatus, comprising:

transforming means for obtaining coefficients of frequency components by transforming signals to be coded into respective frequency components, in transform coding for processing video signals and/or audio signals in block units;

a plurality of quantizing means for obtaining a plurality of different sorts of codes by quantizing the obtained coefficients in accordance with respective different quantization characteristics;

a plurality of inverse quantizing means for obtaining reproduced coefficients on the basis of the obtained codes in correspondence to each of said plurality of quantizing means;

a plurality of inverse orthogonal transforming means for obtaining reproduced signals on the basis of the obtained reproduced coefficients in correspondence to each of said plurality of inverse quantizing means;

error detecting means for obtaining error amounts between the signals to be coded and the reproduced signals obtained by said plurality of inverse orthogonal transforming means;

evaluating means for obtaining weighing values of the signals to be coded per sampling value according to a location of the sampling value per transform block; and selecting means for selecting one of said quantizing means by evaluation of the reproduced signals using the weighing values.

6. The transform coding apparatus of claim 5, wherein the evaluating means obtains the weighing values such that weighing values located near a boundary of each transform block are larger than weighing values located apart from the boundary.

* * * * *